United States Patent [19]

Binal

[11] Patent Number: 5,406,621
[45] Date of Patent: Apr. 11, 1995

[54] TELEPHONE TONE ANALYSIS SYSTEM

[76] Inventor: Mehmet E. Binal, 4490 Madison Ave., Trumbull, Conn. 06611

[21] Appl. No.: 231,309

[22] Filed: Apr. 22, 1994

[51] Int. Cl.6 .............................................. H04M 3/42
[52] U.S. Cl. .................................... 379/386; 379/282; 379/283; 379/351
[58] Field of Search ................. 379/386, 282, 283, 351

[56] References Cited

U.S. PATENT DOCUMENTS

| | | | |
|---|---|---|---|
| 4,825,460 | 4/1989 | Carter et al. | 379/89 |
| 4,926,462 | 5/1990 | Ladd et al. | 379/89 |
| 4,935,958 | 6/1990 | Morganstein et al. | 379/386 |
| 5,070,526 | 12/1991 | Richmond et al. | 379/386 |

Primary Examiner—James L. Dwyer
Assistant Examiner—Jacques M. Saint-Surin
Attorney, Agent, or Firm—John H. Crozier

[57] ABSTRACT

In a preferred embodiment, a method of automating configuration of a voice processing system including automating telephone tone parameter determination, including the automated functions of: generating a first telephone line tone; scanning the first telephone line tone for frequency parameters and cadence parameters; arranging the frequency and cadence parameters in a tone definition block structure; and storing the tone definition block structure into memory of the voice processing system for future use in recognizing the first telephone line tone.

17 Claims, 12 Drawing Sheets

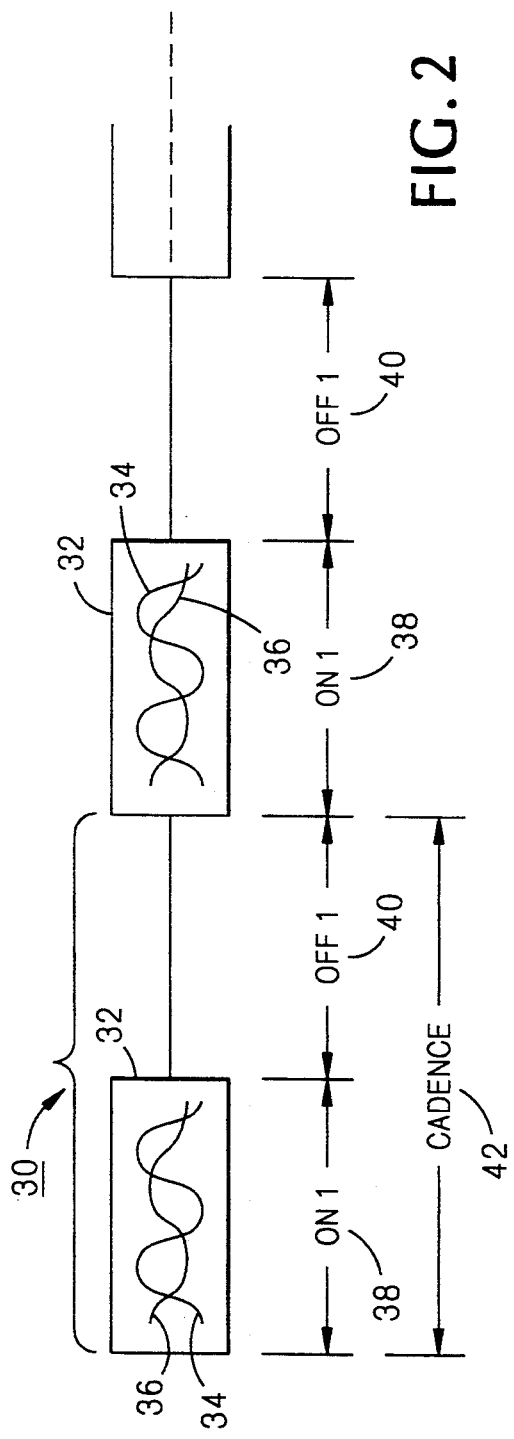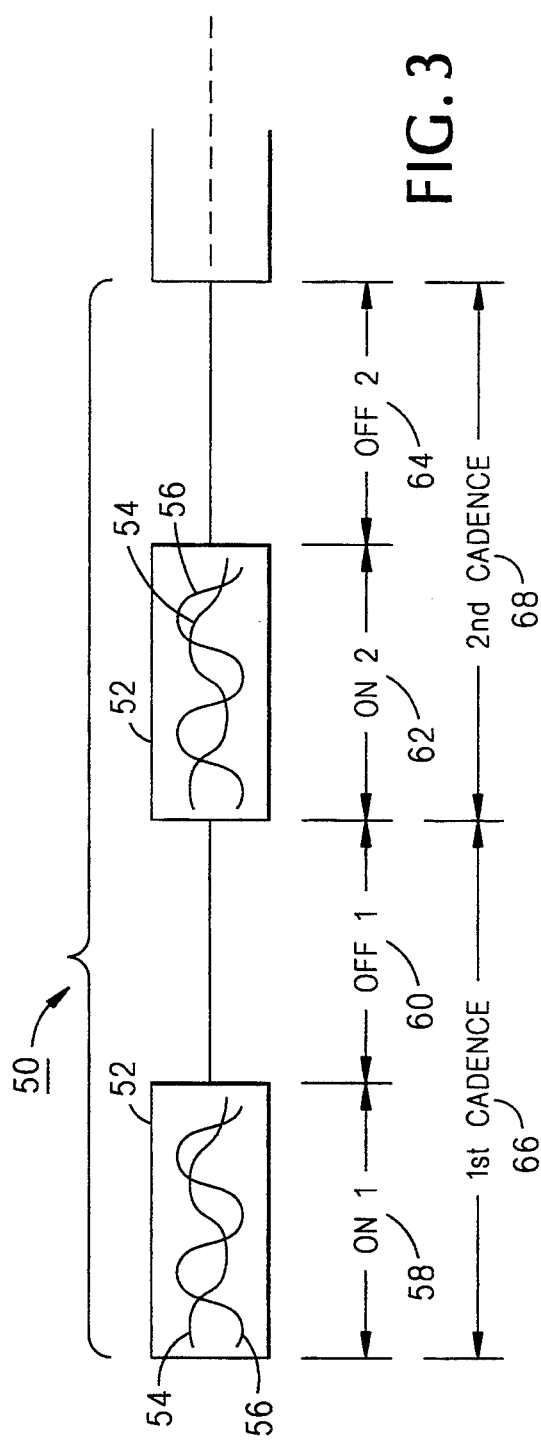

| | |
|---|---|
| TONE TYPE | BYTE |
| TONE EVENT | BYTE |
| FREQUENCY 1 | WORD |
| FREQUENCY 2 | WORD |
| EDGE | BYTE |
| ON-TIME 1 | WORD |
| ON 1 DEVIATION | BYTE |
| OFF-TIME 1 | WORD |
| OFF 1 DEVIATION | BYTE |
| ON-TIME 2 | WORD |
| ON 2 DEVIATION | BYTE |
| OFF-TIME 2 | WORD |
| OFF 2 DEVIATION | BYTE |
| REPETITION COUNT | BYTE |

```
                        ┌─ 90      ┌─ 100
              ──────────DIAGNOSTIC PROGRAM──────────
    AUDIO CTRL   TONE GEN   SWITCHING   SMARTCALL   CONFIG   MISC
                                        DEFINE CPM ────── 104
                                        DEFINE GTD
                                        SCAN CTRL ─────── 106
                                        ADVANCED SETUP ── 102
```

| CHAN | STATUS  | MON | DTMF | CNT | LEVEL | SPEED | FILE   |
|------|---------|-----|------|-----|-------|-------|--------|
| 1    | ON HOOK |     |      | 0   | N     | N     | CHAN01 |
| 2    | ON HOOK |     |      | 0   | N     | N     | CHAN02 |
| 3    | ON HOOK |     |      | 0   | N     | N     | CHAN03 |
| 4    | ON HOOK |     |      | 0   | N     | N     | CHAN04 |
| 5    | N/A     |     |      | 0   | N     | N     | CHAN05 |
| 6    | N/A     |     |      | 0   | N     | N     | CHAN06 |
| 7    | N/A     |     |      | 0   | N     | N     | CHAN07 |
| 8    | N/A     |     |      | 0   | N     | N     | CHAN08 |

| SCAN CONTROL | | | | |
|---|---|---|---|---|
| TONE | TONE | | NO | |
| CPM FILENAME | GTD FILENAME | | TELCO ROUNDING | |
| 300 | 1000 | 10 | 10 | 6 |
| SCAN FROM | SCAN TO | STEP SIZE | CADENCE DEV | MIN REP |

FIG. 7

TELEPHONE TONE ANALYSIS SYSTEM

BACKGROUND OF THE INVENTION

1. Field of the Invention

The present invention relates to telephone voice processing systems generally and, more particularly, but not by way of limitation, to a novel method which permits automated configuration of a voice processing system with call progress analysis and hang-up supervision parameters including an automated analysis of telephone tones that must be recognized by the voice processing system.

2. Background Art

A voice processing system must be able to operate successfully in a variety of telephone system environments. It can be connected to the lines of a local central office (CO), connected to the lines of a foreign exchange central office (FX), connected to a private branch exchange (PBX), and so forth. In order to operate successfully in all of these environments, either singly or in combination, a voice processing system must detect a variety of tones that indicate certain conditions on a telephone line, as for example, dial tone, busy, ringback, caller hang-up, etc. It is impractical to have fixed configurations available for all possible telephone system environments.

Presently, configuration information is entered into a voice processing system using a diagnostic program operating in the voice processing system. The entry of configuration information requires a relatively skilled technician having specialized knowledge of the various telephone tone parameters and being skilled in the configuration process, as well as interaction with both a monitor display and keyboard, both being attached to the voice processing system. In addition, the configuration process must be physically executed at the location of the monitor display and keyboard.

These configuration requirements represent extra expense in both hardware and personnel to the voice processing system user. Furthermore, known voice processing systems have limited capability to permit determination and adaptation to inherent idiosyncrasies and anomalies in the actual telephone tone parameters versus published nominal parameters. What is needed, but heretofore has been unavailable, is a method whereby a voice processing system can provide an automated configuration of a voice processing system including an automated analysis of different telephone tones for unique parameters, and which also permits verification and selection of the most appropriate telephone tone parameters when configuring a voice processing system. Such a method should also permit, in certain instances, the creation and definition of specific telephone tones for use with a voice processing system.

What is also needed is a method to permit an automated configuration of a voice processing system by one relatively unskilled in the art of voice processing system configuration whereby the need for a monitor display and keyboard is eliminated so as to reduce the cost of voice processing equipment to the user.

Accordingly, it is a principal object of the present invention to provide a method to automate configuration of a voice processing system so as to be accomplished by relatively unskilled technicians or other personnel, which may include the user.

Another object of the present invention is to provide a method to automate analysis of telephone tones of a telephone system environment required for configuration of a voice processing system.

A further object of the present invention is to provide a method to automate an accurate determination of the actual telephone tone parameters exhibited by a telephone system environment.

An additional object of the present invention is to permit configuration of a voice processing system without need for a monitor display and keyboard attached to the voice processing system.

It is another object of the present invention to permit configuration of a voice processing system at a location either in proximity to, or remotely from, the voice processing system.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method of automating configuration of a voice processing system including automating telephone tone parameter determination, comprising the automated functions of: generating a first telephone line tone; scanning said first telephone line tone for frequency parameters and cadence parameters; arranging said frequency and cadence parameters in a tone definition block structure; and storing said tone definition block structure into memory of said voice processing system for future use in recognizing said first telephone line tone.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 2 is a block diagram showing the general characteristics of a dual frequency, single cadence tone.

FIG. 3 is a block diagram showing the general characteristics of a dual frequency, dual cadence tone.

FIG. 6 is a monitor display showing a diagnostic program main menu.

FIG. 7 is a monitor display showing a scan control function display.

DETAILED DESCRIPTION OF THE PREFERRED EMBODIMENTS

Figure 1:
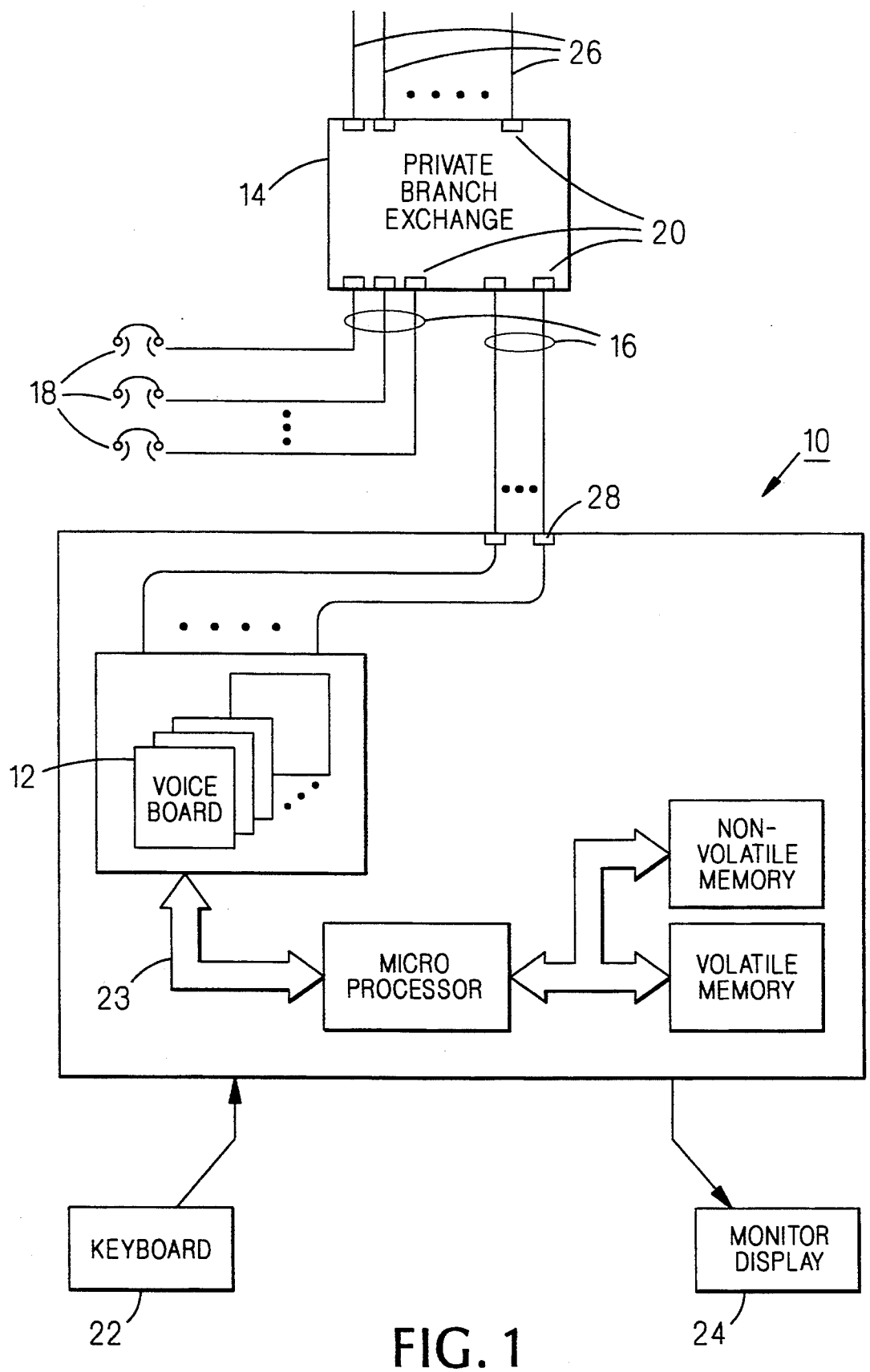
FIG. 1 is a block/schematic diagram showing the elements which operate in conjunction with a first embodiment of the system of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Reference should now be made to FIG. 1 which shows the various elements associated with the system of the present invention. A personal computer-based voice processing system, generally indicated by reference numeral 10, which includes one or more voice boards, as at 12, installed within, and which includes one or more software programs operating within, and which is connected to a host private branch exchange (PBX) 14 via one or more telephone channels 16. Telephone channels 16 connect PBX 14 first interface ports, as at 20, to voice processing system 10 second interface ports as at 28. PBX 14 is further interconnected outwardly to a plurality of telephone lines 26 and inwardly to a plurality of extension telephone handsets 18 via interface ports 20.

FIG. 1 also shows voice processing system 10 equipped with a keyboard 22 and a monitor display 24 used, in one preferred embodiment of the system of the present invention, for automated configuration of the voice processing system with telephone tone parameters, whether or not the telephone tone parameters are known.

Reference should now be made to FIG. 2 which shows the general characteristics of a first telephone system tone, generally indicated by the reference numeral 30. Tone 30 can be seen as characterized by a frequency component 32, and by a cadence component 42. Frequency component 32 may be constituted from either a single frequency or dual frequencies. In this case, FIG. 2 shows frequency component 32 to be constituted from dual frequencies 34 and 36. Cadence component 42 may be either a single cadence or a dual cadence. In this case, FIG. 2 shows cadence component 42 as a single cadence constituted by the sum of ON 1 time 38, which is the time duration that frequency component 32 is switched onto a telephone line, and OFF 1 time 40, which is the time duration that frequency component 32 is switched off the telephone line. Tone 30 repeats on a periodic basis as determined by cadence component 42.

Reference should now be made to FIG. 3 which shows the general characteristics of a second telephone system tone, generally indicated by reference numeral 50. Tone 50 can be seen as characterized by a frequency component, generally indicated by reference numeral 52, and by two cadence components, a first cadence 66 and a second cadence 68. Frequency component 52 may be constituted from either a single frequency or dual frequencies. FIG. 3 shows frequency component 52 to be constituted from dual frequencies 54 and 56. First cadence 66 is constituted by the sum of ON 1 time 58 and OFF 1 time 60, and second cadence 68 is constituted by the sum of ON 2 time 62 and OFF 2 time 64. Tone 52 repeats on a periodic basis as determined by the sum of first cadence 66 and second cadence 68.

Figures 4, 5:
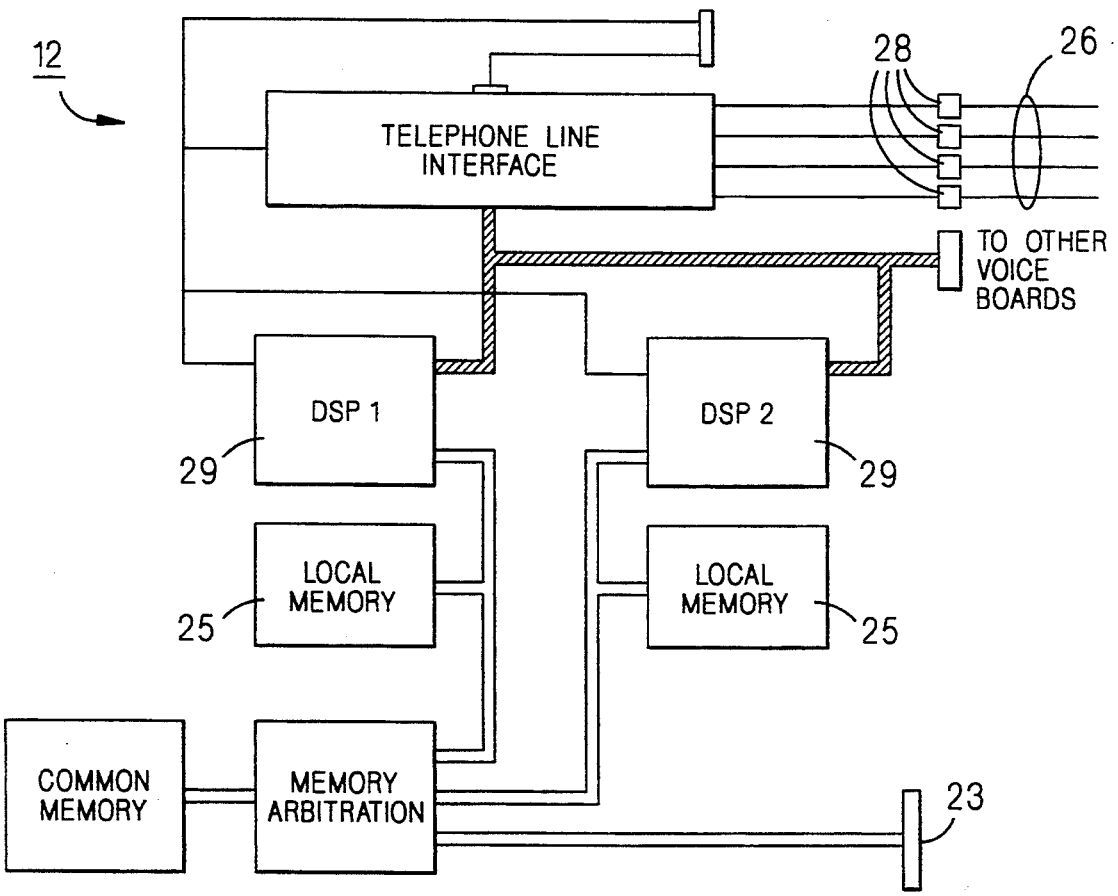
FIG. 4 is a table showing a tone definition block (TDB) structure.
FIG. 5 is a block diagram of a voice board used in a voice processing system.

Reference should now be made to FIG. 4 which shows a Tone Definition Block Structure (TDB) which is used to fully define telephone tone parameters. Once telephone tone parameters are defined for each specific telephone tone in a telephone system environment, a telephone tone is considered fully defined and can then be accurately recognized by a voice processing system during call progress monitoring and hang-up supervision. Tone Definition Block Structure is used to define telephone tone parameters for two main areas of tone detection: General Tone Detection (GTD) and Call Progress Analysis (CPA).

General Tone Detection refers to telephone line conditions incurred during caller hang-up while voice board 12 (FIG. 1) of voice processing system 10 (FIG. 1) is active, i.e., after an inbound call has accessed the voice processing system.

Call Progress Analysis refers to analysis of a sequence of telephone line conditions incurred during an outbound call from voice processing system 10 (FIG. 1). After telephone channel 16 is established in an OFF-HOOK state and telephone number digits are dialed, the progress of a call is analyzed to determine the outcome of the call. During the CPA, several tones will usually have to be programmed for detection by voice processing system 10 because several events may occur as for example: line busy, operator intercept, facsimile tone encountered, etc. Different telephone system environments may incur different tone detection requirements.

The following definitions refer to tone parameters of a TDB:

Tone Type: Used to define the general type of CPA tone; i.e. Dial Tone, Busy, Reorder, and Ringback.

Tone Event: For CPA used to indicate call termination type, i.e. Busy/Reorder, Operator Intercept, and Facsimile Tones; For GTD used to provide an ASCII coded ID number.

Frequency 1: The first frequency of a dual frequency tone or the only frequency of a single frequency tone.

Frequency 2: The second frequency of a dual frequency tone or zero for a single frequency tone.

Edge: For CPA not used; For GTD defines whether the GTD event will be queued (available for use by voice processing system 10 at the beginning of the tone (leading edge) or after the tone has ended (trailing edge).

ON 1 Time: The time that tone energy is on a telephone line for a first cadence.

ON 1 Deviation: The percent deviation allowed for ON 1 Time as it is being measured by voice board.

OFF 1 Time: The time that there is no tone energy on a telephone line after ON 1 Time.

OFF 1 Deviation: The percent deviation allowed for OFF 1 Time as it is being measured by a voice board.

ON 2 Time: The time that tone energy is on a telephone line after a first cadence period. ON 2 Time is zero for a single cadence tone.

ON 2 Deviation: The percent deviation allowed for OFF 2 Time as it is being measured by a voice board.

OFF 2 Time: The time that there is no tone energy on a telephone line after ON 2 Time. OFF 2 Time is zero for a single cadence tone.

OFF 2 Deviation: The percent deviation allowed for OFF 2 Time as it is being measured by a voice board.

Repetition Count: For CPA not used; For GTD specifies the number of times a GTD cadence is to be seen on a telephone line before queuing (recognizing and making use of) the GTD digit or event.

Reference should now be made to FIG. 5 which shows a block diagram of voice board 12 used in voice processing system 10 (FIG. 1). Voice board 12 contains digital signal processors 29 which, operating under control of a diagnostic software program (described below), and as communicated to voice board 12 over PC Bus 23 and stored in local memory 25, in part provide for analysis of telephone tones incurred in a telephone system environment.

Reference should now be made to FIG. 6 which shows diagnostic program 90 main menu as displayed on monitor display 24 (FIG. 1), for which a smartcall menu option 100 is shown as being selected. Diagnostic program 90, controls digital signal processor 28 of voice board 12 (FIG. 5) which provides, among other things, a frequency scan to determine telephone tone frequency content and provides a relative energy measurement versus time to determine telephone tone cadence content. When selecting smartcall menu option 100 of diagnostic program 90, a smartcall menu window is displayed below the smartcall menu option.

There are two different ways for which telephone tone parameters of either General Tone Detection or Call Progress Analysis operation can be defined and entered into a TDB of a particular telephone channel 16 for use by voice processing system 10.

The conventional way a TDB may be defined is when frequencies and cadences of each telephone line tone used are known (i.e., they are standard TELCO tones or they are published in a PBX User's Manual). In this case, TDB parameters are entered directly via keyboard 22 (FIG. 1) into a file stored in voice processing system 10 non-volatile memory (FIG. 1), without need for telephone tone analysis. The other way is according to the method of the present invention.

Reference should now be made to FIG. 7 which shows scan control function 108 which is displayed as a result of selecting scan control menu option 102 of smartcall menu option 100 of diagnostic program 90. Using scan control function 108 and keyboard 22 (FIG. 1), a CPM Filename or GTD Filename may be defined into which TDB parameters are stored for future use by voice processing system 10. When keyboard 22 and no further entries are required for scan control function 108. Key F2 of keyboard 22 is depressed to save CPM or GTD Filenames, and key ESC of keyboard 22 is depressed to return to diagnostic program 90 main menu display (FIG. 6).

Figure 8:
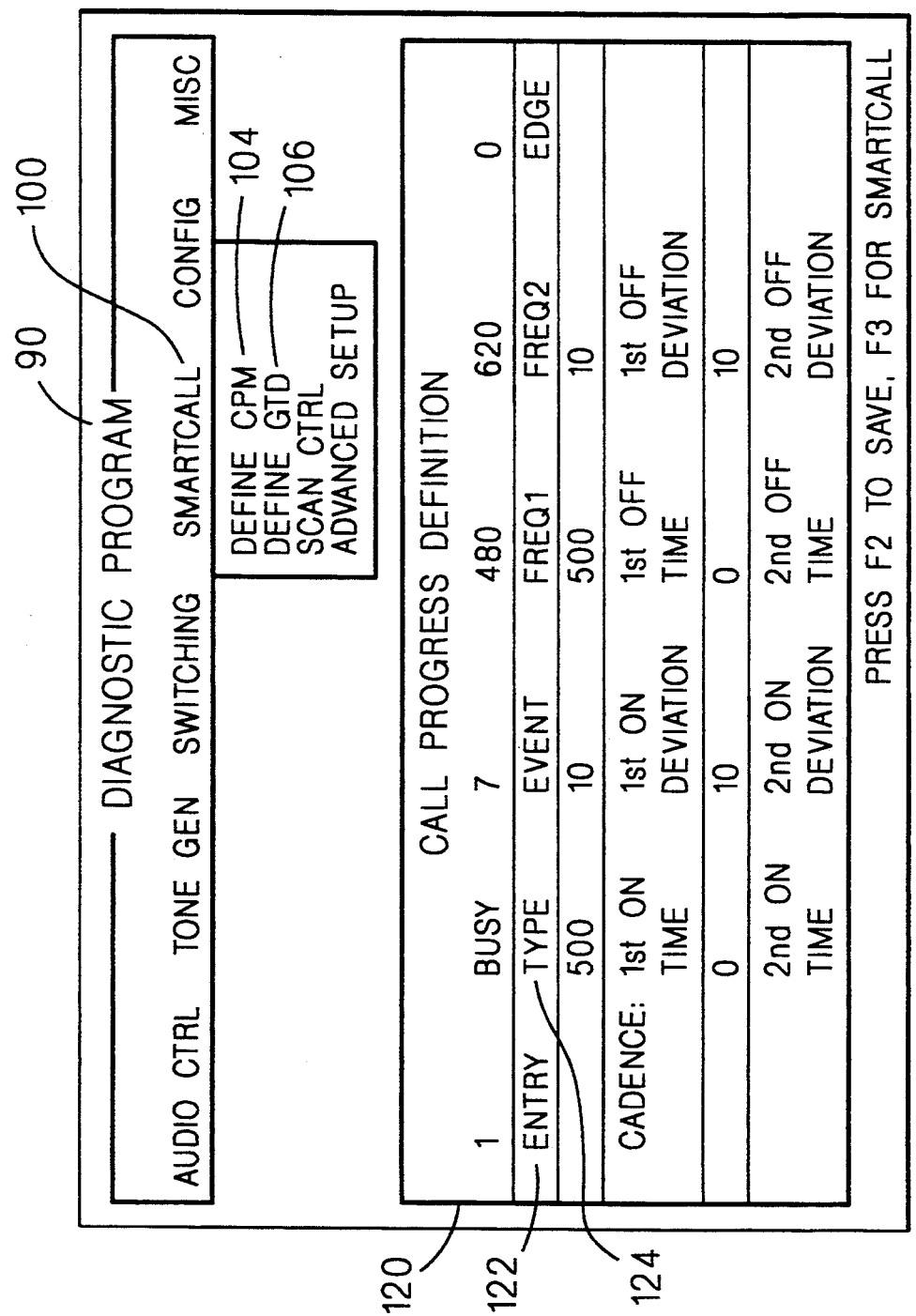
FIG. 8 is a monitor display showing a call progress definition function display.

Reference should now be made to FIG. 8 which shows call progress definition function 120 displayed on monitor display 24 (FIG. 1). Call progress definition function 120 is displayed as a result of selecting either define CPM 104 or define GTD 106 from smartcall menu window of smartcall menu option 100 of diagnostic program 90 main menu (FIG. 6). Call progress definition function 120 displays TDB parameters for each specific telephone line tone whereby each value may be entered or modified using keyboard 22 (FIG. 1). Entry 122 assigns a unique number for each tone to be defined in call progress definition function 120. Type 124 defines a tone type as chosen from a group of tones such as dial tone, line busy, reorder, and ring back, and is entered from keyboard 22 (FIG. 1).

Should remaining TDB parameters for type 124 be known, they may be entered via keyboard 22 (FIG. 1). Once TDB parameter entry is complete for type 124, key PAGE DOWN is depressed on keyboard 22 to display a new call progress definition function display 120 and define a new TDB for another type 124, or, if no further tone definitions are required, key F2 of keyboard 22 is depressed to store all defined TDB parameters into local memory 25 of voice board 12 (FIG. 5) for a selected telephone channel 16 for operation with diagnostic program 90 and voice processing system 10. TDB parameters are saved to a file (a filename defined earlier using scan control function 108) by depressing key ESC on keyboard 22 and selecting a YES option when displayed on monitor display 24 (FIG. 1).

In the method of the present invention, TDB may be defined when frequency and cadence tone parameters are unknown or require analysis to determine deviations versus published values. In this case, smartcall menu option 100 of diagnostic program 90 main menu (FIG. 6) is selected for the purpose of scanning a telephone frequency band for each specific tone to determine TDB parameters.

Reference should again be made to FIG. 7 which shows scan control function 108. Since, in this case, call analysis is to be performed to determine TDB parameters, scan controlling parameters are defined, in addition to either CPM or GTD FileNames, for scan control function 108 by using keyboard 22 (FIG. 1) for parameter data entry as follows:

Scan From and Scan To: These parameters define a frequency range over which tone analysis will occur. The frequency range of the telephone channel is 300 Hz to 3300 Hz. In practice, most call progress tones and general tones encountered in typical PBX or CO environments will be in the range 300 Hz to 1000 Hz, so 300 Hz to 1000 Hz is a range chosen for a default scan and will take much less time to scan. The frequency range can be expanded beyond the default value if a frequency tone is known to be greater than 1000 Hz, or if a scan produces no tone frequency.

Step Size: This parameter determines the size of a frequency step used when scanning a defined frequency range. A default value is set at 10 Hz to provide a high resolution of frequencies.

Cadence Deviation: This parameter defines the percent deviation to be used for ON 1 time deviation, OFF 1 time deviation, On 2 time deviation, and Off 2 time deviation, when a TDB is created for an analyzed tone.

Min Rep: This parameter defines a minimum number of repetitions of a tone's cadence to be recognized before a tone analysis process is terminated. Specifying a higher number of repetitions provides a greater accuracy in determining ON 1 time, OFF 1 time, ON 2 time, and OFF 2 time durations, but requires a much longer analyzing time.

TELCO Rounding: When this parameter is set to OFF, the actual tone frequencies encountered during a scan are used. If it is suspected that there may be a large variation or error in a frequency being analyzed due, for example, to an unregulated Central Office environment, then this parameter is set to ON, and a frequency determined from a scan is rounded to the nearest TELCO frequency boundary.

Once scan parameters have been defined via scan control function 108, key F2 of keyboard 22 (FIG. 1) is depressed to save the scan parameters, and key ESC is depressed to return to diagnostic program 90 main menu (FIG. 6). Smartcall menu option 100 of diagnostic program 90 main menu is selected which displays smartcall menu options. From smartcall menu options, define CPM 104 is selected to scan for CPA tone parameters or define GTD 106 is selected to scan for a GTD tone.

Reference should now be made to FIG. 8. Selecting either define CPM 104 or define GTD 106 (FIG. 6) results in call progress definition function 120 to be displayed containing TDB parameters, similar to that for direct entry of TDB parameters, discussed previously. However, in this case TDB parameters as displayed on call progress definition function 120 will be determined by automated tone analysis.

Figures 9, 10:
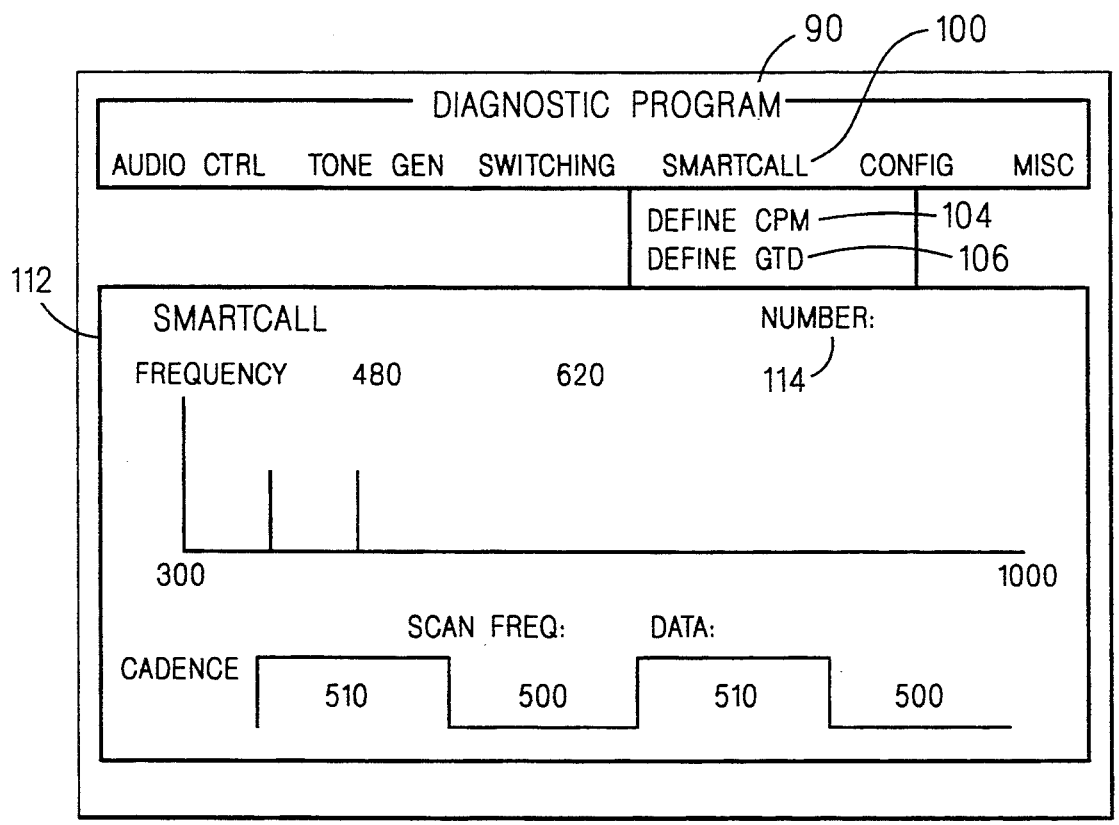
FIG. 9 is a monitor display showing a smartcall function display.
FIG. 10 is a monitor display showing a scan results function display.

Reference should now be made to FIG. 9 which shows smartcall function 112 which is displayed as a result of depressing key F3 of keyboard 22 (FIG. 1) while call progress definition function 120 (FIG. 8) is displayed on monitor display 24 (FIG. 1). Smartcall function 112 analyzes a telephone line by scanning for tones across a specified range of frequencies within a telephone channel 16. A scan is performed in 10 Hz steps and cadence ON and OFF periods are calculated automatically. A specific telephone channel 16 (FIG. 1), as a source of a telephone tone to be analyzed, is connected to a specific interface port 28 of voice board 12 in voice processing system 10.

A telephone tone analysis scan is begun when ENTER key of keyboard 22 (FIG. 1) is depressed while displaying smartcall function 112 on monitor display 24. Should a telephone number need to be dialed for creation of a particular tone to be analyzed, a telephone number is entered at number 114 shown on smartcall 112 display using keyboard 22. One of the following sequences occurs, depending on which tone is being analyzed:

Analyzing a dial tone: Dial tone is present on a PBX or CO after taking a telephone line to an OFF-HOOK condition and before any digits have been dialed. To analyze for dial tone, ENTER key on keyboard 22 (FIG. 1) is depressed to start a smartcall function 112 scan.

Analyzing a busy tone: The number of a PBX extension phone or CO phone must be entered at number 114 of smartcall function 112 display and then a specific telephone set corresponding to number 114 is taken OFF-HOOK. To analyze for busy tone, ENTER key on keyboard 22 (FIG. 1) is depressed to start a dial-out process and a smartcall function 112 scan.

Analyzing for a ringback (audible ringing) tone: A telephone number of a PBX extension phone or CO phone is entered at number 114 of the smartcall function 112 display a telephone corresponding to number 114 is verified as not being in an OFF-HOOK condition. To analyze for ringback tone, ENTER key of keyboard 22 (FIG. 1) is depressed to start a dial-out process and a smartcall function 112 scan.

Reference should now be made to FIG. 10 which shows scan results function 110. After smartcall function 112 scan is performed (FIG. 9) a scan results function 110 displays the calculated parameters for frequency and cadence. Pressing PAGE UP and PAGE DOWN keys on keyboard 22 (FIG. 1) permits a display of multiple cadences, if any, on monitor display 24 (FIG. 1). A single cadence calculation is indicated by an END-OF FILE message displayed on monitor display 24 after depressing PAGE UP and PAGE DOWN keys, each one time.

If scan results function 110 displays several pages as a result of depressing PAGE UP and PAGE DOWN keys, then more than one cadence was calculated and a best cadence value must be selected by a user applying some simple rules as well as listening to the tone as output on a speaker of personal computer-based voice processing system 10 as a tone is being analyzed so as to get a sense for an overall cadence during a scan analysis period.

Once the appropriate results from the scan results function 110 have been evaluated, this information can be saved to a TDB file (FIG. 4) in voice processing system 10. The SAVE option of scan results function 110 display is toggled to YES by moving cursor of monitor display 24 (FIG. 1) and depressing the SPACE BAR and then depressing key F2 saves TDB file to non-volatile memory. TDB parameters of call progress definition function 120 will be automatically filled with the values calculated in scan results function 110. Other fields such as type 124 and event 122 can now be entered from keyboard 22 (FIG. 1) to complete a TDB for a specific tone analysis.

Successive analysis iterations using different tone types will ultimately complete call analysis and TDB will be saved in files of voice processing system 10 for future use by voice board 12.

Figure 11:
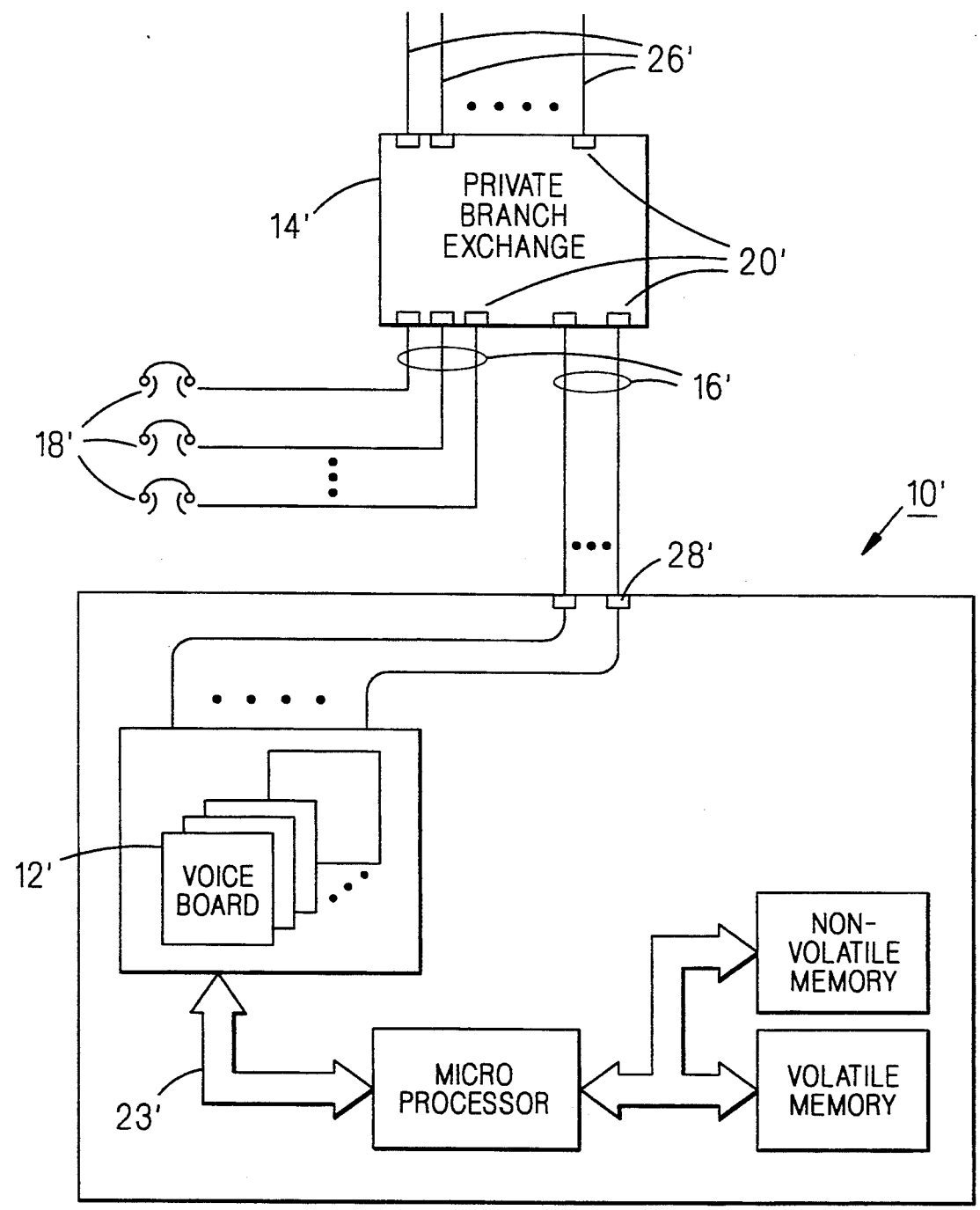
FIG. 11 is a block/schematic diagram showing the elements which operate in conjunction with a second embodiment of the system of the present invention.

Reference should now be made to FIG. 11 which shows voice processing system 10', in a second preferred embodiment of the present invention. System 10' is similar, in some respects to system 10 of FIG. 1 and elements common to FIG. 1 are given primed reference numerals. Those elements have the same functions as described above with reference to FIG. 1. It can be seen that system 10' has no keyboard and monitor display, but may be employed for configuration of the voice processing system with telephone tone parameters, whether or not the telephone tone parameters are known, without requiring keyboard entries and without requiring the skill an operator of the same must possess.

Figure 12:
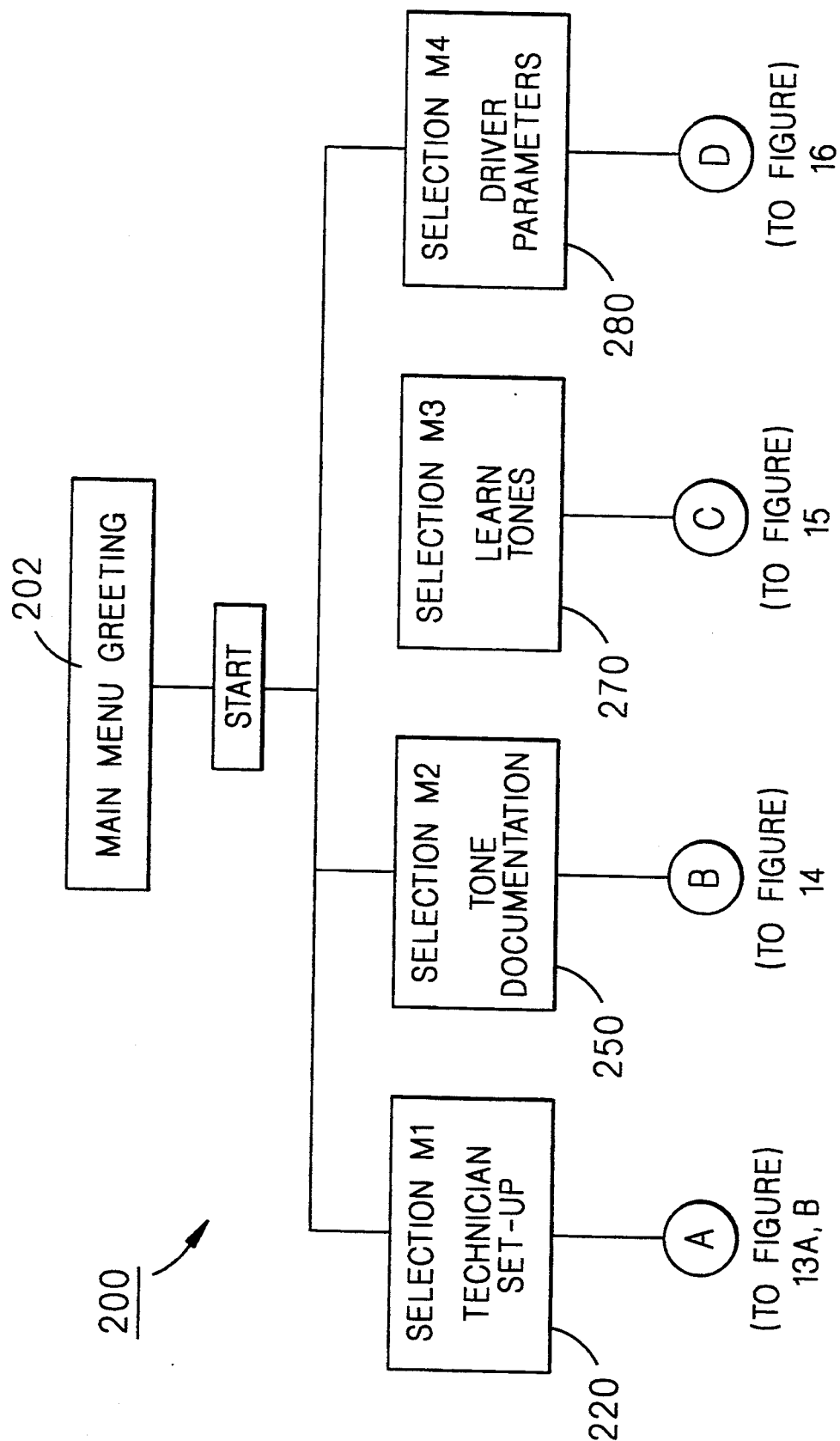
FIG. 12 is a fragmentary system flow diagram showing main menu selections of call analysis by telephone handset.

Reference should now be made to FIG. 12 which shows the main menu selections of a system flow diagram, generally indicated by the reference numeral 200, in the second preferred embodiment. System flow diagram 200 includes a main menu greeting 202 which is initiated via dial-in from an originating telephone extension to a first telephone extension 18 supported by PBX 14 (FIG. 11), whereby a technician then makes a selection, by depressing directed keys on the telephone extension, from a first group of voice menu prompts consisting of technician set-up function 220, tone documentation function 250, learn tones function 270, and voice board driver parameters function 280.

Figure 13A:
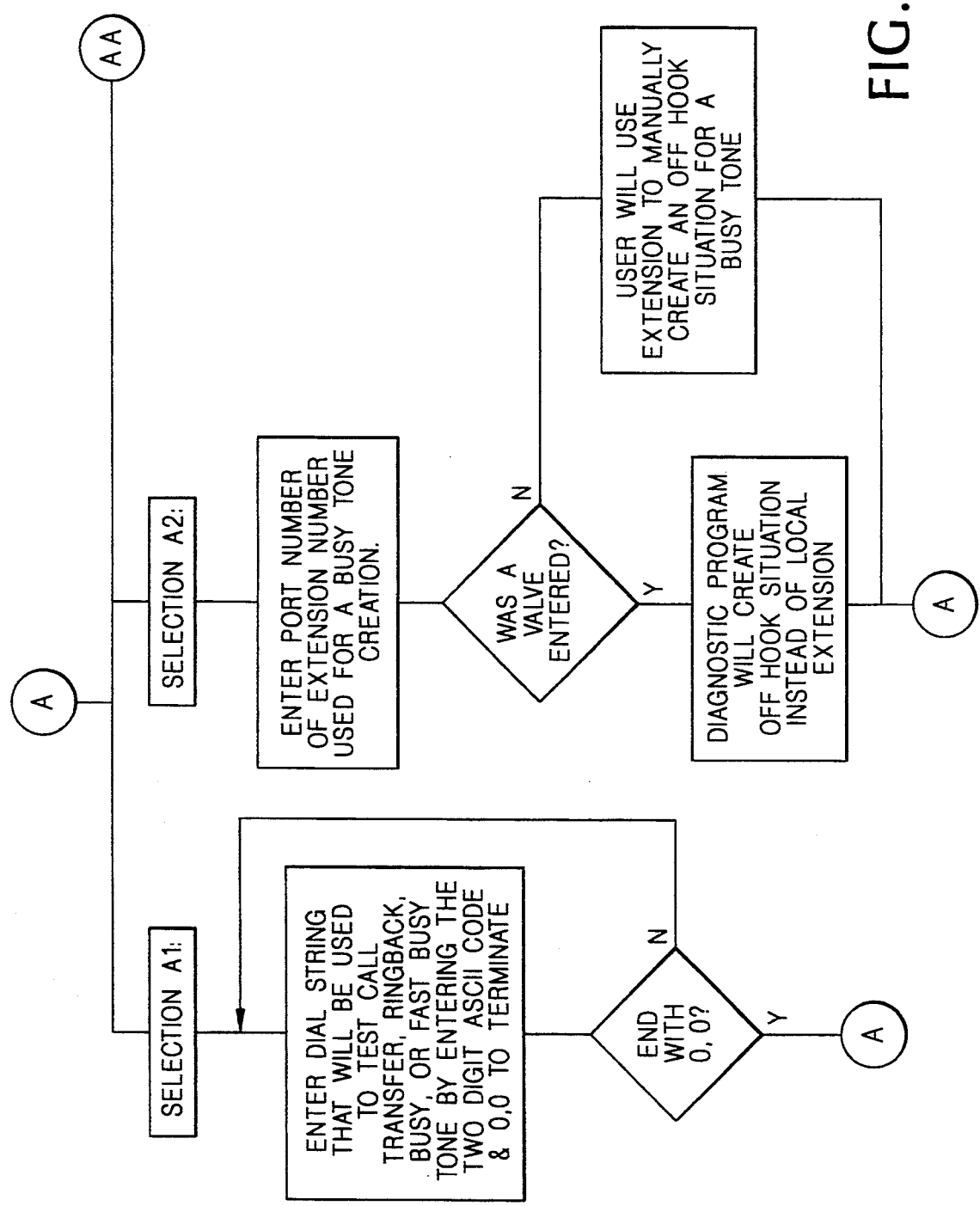
FIGS. 13A & 13B are fragmentary system flow diagrams showing a technician set-up function.
Figure 13B:
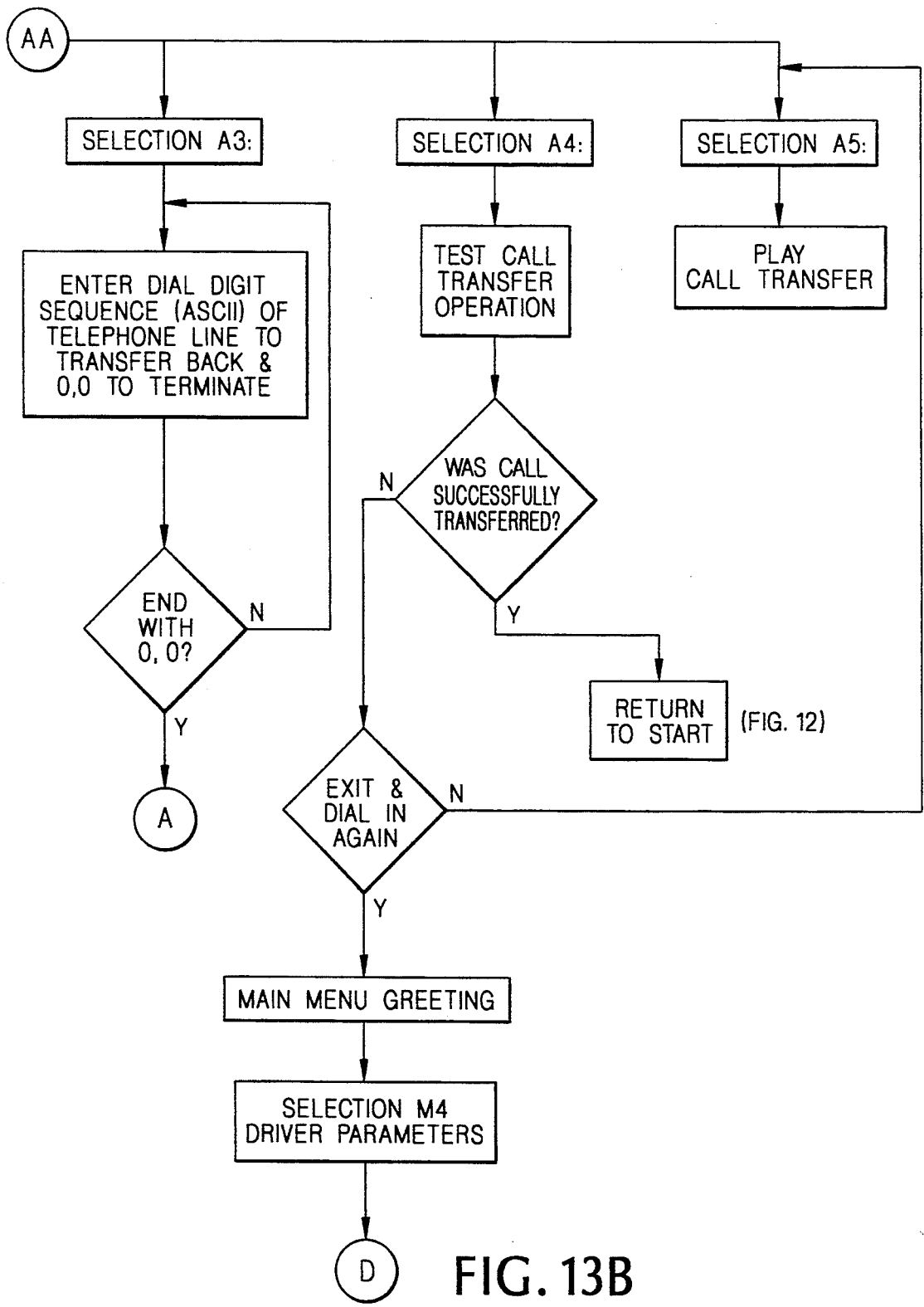

Reference should now be made to FIGS. 13 A & B which show the flow diagrams of technician set-up function 220. Selection of technician set-up function 220 permits a technician to select form a second group of voice menu prompts consisting of selection A1, selection A2, selection A3, and selection A4.

Selection A1 is chosen to enter a dial string in ASCII code representing a number of second telephone extension 18 (FIG. 11) to be used to test either a call transfer function, a ringback tone, a busy tone, or a fast busy tone. Dial string entry is terminated by entry of 0,0, at which time the second group of voice prompts recurs to permit a new selection.

Selection A2 is chosen to enter a PBX 14 port number 20 (FIG. 11) for automated busy tone creation. When a port number value is entered, diagnostic program 90 (FIG. 6) will create an off-hook condition to cause a busy tone to be generated on associated telephone channel 16. When a port number value is not entered, diagnostic program 90 will utilize an actual off-hook condition as caused by a technician physically using a third telephone extension 18 (FIG. 1) to manually create an off-hook condition for a busy tone generation. Second group of voice menu prompts recurs to permit a new selection.

Selection A3 is chosen to enter a dial digit sequence in ASCII code of a number of second telephone extension 18 to which to transfer a telephone line back upon completion of testing either a call transfer function, a ringback tone, a busy tone, or a fast busy tone. The dial digit sequence is terminated by entry of 0,0, at which time second group of voice menu prompts recurs to permit a new selection.

Selection A4 is chosen to permit performing a test of call transfer function. When a call transfer operation is successfully completed a technician exits from second group of voice menu prompts at which time first group of voice menu prompts recurs to permit a new selection. When a call transfer function is not successful, a technician must terminate a call by hanging up and then must dial in again to voice processing system 10, receiving main menu greeting 202, and whereby selection M4, driver parameters of first group of voice menu prompts can be chosen (described below) so that one or more voice board 12 driver parameters cam be adjusted to permit proper operation of call transfer function before proceeding with other automated call analysis functions.

Selection A5 is chosen to permit playback of a recorded test of a call transfer function in order to listen to ringback tone in the event called telephone extension 18 (FIG. 11) was not answered.

Figure 14:
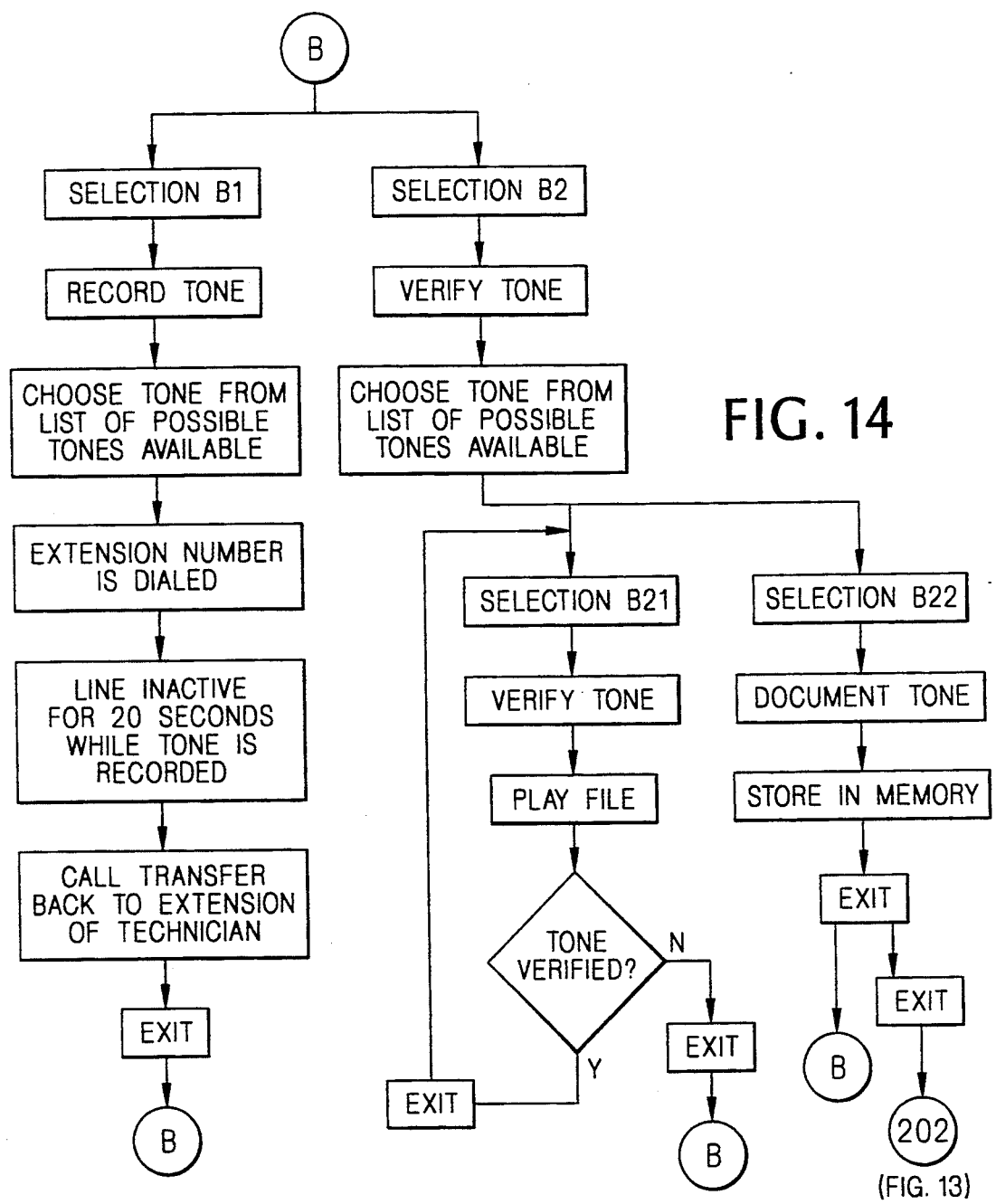
FIG. 14 is a fragmentary system flow diagram showing a tone documentation function.

Reference should now be made to FIG. 14 which shows a flow diagram of tone documentation function 250. Selection of tone documentation function 250 permits a technician to select from a third group of voice menu prompts consisting of selection B1 and selection B2.

Selection B1 is chosen to permit creation and recording telephone tones that will be used with voice processing system 10' (FIG. 11). The telephone tone recording will be subsequently used by a learn tones phase of automated tone analysis and configuration of voice processing system 10'. When selection B1 is chosen, a list of possible telephone tones is presented by voice menu from which one telephone tone is chosen. When a telephone tone is chosen, a number of a telephone extension 18 is dialed (as defined in technician set-up function 220), telephone line 16 of originating telephone extension becomes inactive for 20 seconds during which time the chosen telephone tone is created and is recorded. At the completion of recording the chosen telephone tone, control of telephone line 16 is transferred back to second telephone extension 18. The technician exits selection B1 and third group of voice menu prompts of tone documentation function 250 recurs to permit a new selection.

Selection B2 is chosen to permit verification and documentation of a telephone tone just recorded during selection B1. When selection B2 is chosen, a list of possible telephone tones is presented by voice menu. A same telephone tone as just recorded during selection B1 should be chosen, from a list of possible telephones tones, and then a fourth group of voice menu prompts is presented consisting of selection B21 and selection B22.

Selection B21 causes a telephone tone as chosen in B2 to be played back for verification by a technician. If the played back telephone tone is correct, the technician exits selection B21, fourth group of voice menu prompts recurs, and technician chooses selection B22 to document the verified telephone for later learn tone function 270 (described below). If the played-back telephone tone is not correct, the technician exits selection B21, exits selection B2, at which time third group of voice menu prompts recurs and technician must make selection B1 again to re-create and re-record the telephone tone that was not verified as correct.

Tone documentation function 250 is repeated iteratively until all relevant telephone tones of a telephone system environment to be configured into voice processing system 10', have been created, recorded, verified, and documented for analysis.

Figure 15:
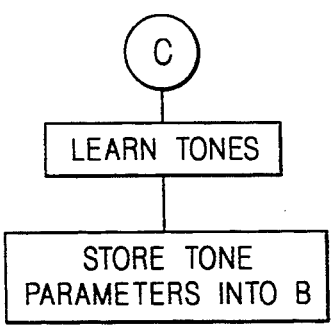
FIG. 15 is a fragmentary system flow diagram showing a learn tones function.

Reference should now be made to FIG. 15 which shows a system flow diagram for learn tones function 290 (FIG. 12) which should be chosen after successfully completing tone documentation 250. Once learn tones 290 is selected, programs in personal computer-based voice processor system 10 (FIG. 1) automatically perform analytical calculations for all telephones tones that have been verified and documented, whereby such analytical calculations determine the appropriate configuration parameters for a connected telephone system environment, and store these configuration parameters in non-volatile memory for future use by voice processing system 10 (FIG. 11) in subsequent telephone calls.

Figure 16:
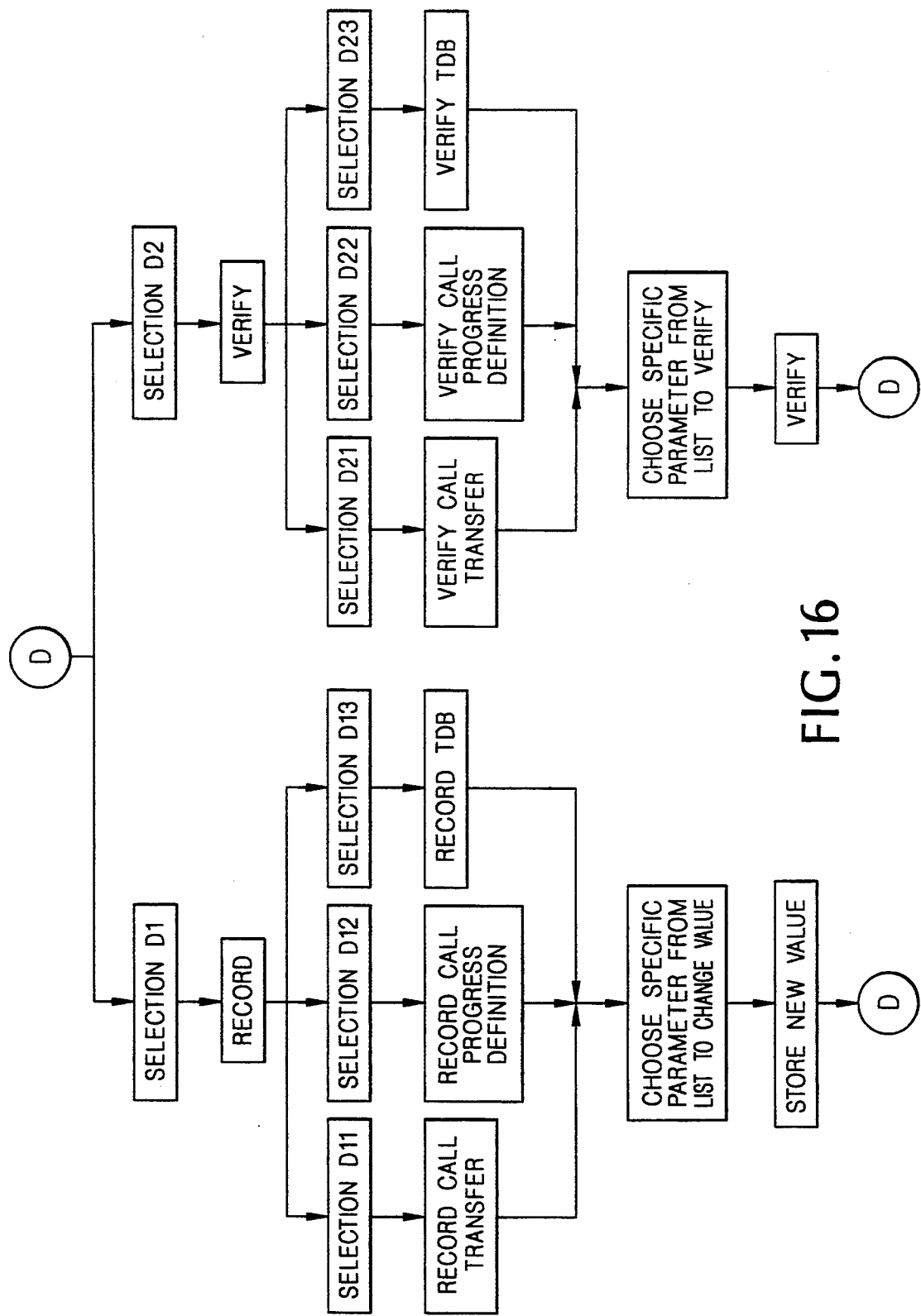
FIG. 16 is a fragmentary system flow diagram showing a voice board driver parameters function.

Reference should now be made to FIG. 16 which shows a system flow diagram of software driver parameters function 300 for use with voice board 12. Selection of driver parameters function 300 permits a technician to select from a fifth group of voice menu prompts consisting of selection D1 and selection D2.

Selection D1 is chosen to permit changing recorded and stored telephone tone information. Selection of D1 permits a sixth group of voice menu prompts consisting of selection D11, selection D12, and selection D13.

Selection D11 is chosen to permit changing the values of call transfer parameters recorded.

Selection D12 is chosen to permit changing the values of call progress definition parameters recorded.

Selection D13 is chosen to permit changing the values of tone definition block parameters recorded.

Upon choosing either selection D11, D12, or D13, a voice menu list is presented of the parameters which may be changed. A specific parameter is chosen and a new value is entered.

Selection D2 of fifth group of voice prompts is chosen to permit playback and verifying stored telephone tone information. Selection of D2 permits a seventh group of voice menu prompts consisting of selection D21, selection D22, and selection D23.

Selection D21 is chosen to playback and verify the parameters of a call transfer function.

Selection D22 is chosen to playback and verify the parameters of a call progress definition.

Selection D23 is chosen to playback and verify the parameters of a tone definition block.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method of automating configuration of a voice processing system including automating telephone tone parameter determination, comprising the automated functions of:
   (a) receiving a first telephone tone, said first telephone tone having an unknown and previously unlearned frequency;
   (b) scanning said first telephone tone for frequency parameters and cadence parameters;
   (c) arranging said frequency and cadence parameters in a tone definition block structure created using one or more interactive diagnostic programs operating within said voice processing system for scanning of said first telephone tone, said tone definition block structure defining telephone tone parameters including two or more telephone tone parameters selected from the group consisting of:
   (i) a Tone Type which defines a general type of Call Progress Analysis tone;
   (ii) a Tone Event which defines a call termination type for General Tone Detection used to provide an ASCII coded ID number;
   (iii) a First Frequency value which defines a first frequency of a dual frequency tone or an only frequency of a single frequency tone for said frequency parameter;
   (iv) a Second Frequency value which defines a second frequency of a dual frequency tone or a zero for a single frequency tone for said frequency parameter;
   (v) an Edge value which defines whether a General Tone Detection event will be queued (available for use by said voice processing system at said telephone line tone beginning (leading edge) or after a tone has ended (trailing edge));
   (vi) a First ON Time value which defines a time that tone energy is on a telephone line for a first cadence of said cadence parameter;
   (vii) a First ON Deviation value which defines a percent deviation allowed for said First ON Time of said first cadence of said cadence parameter as it is being measured by a voice board in said voice processing system;
   (viii) a First OFF Time value which defines a time that there is no tone energy on a telephone line following said First ON Time for said first cadence;
   (ix) a First OFF Deviation value which defines a percent deviation allowed for said First OFF Time of said first cadence of said cadence parameter as it is being measured by a voice board in said voice processing system;
   (x) a Second ON Time value which defines a time that tone energy is on a telephone line for a second cadence of said cadence parameter following said first cadence period and whereby said Second ON Time is zero for a single cadence tone;
   (xi) a Second ON Deviation value which defines a percent deviation allowed for said Second ON Time of said second cadence of said cadence parameter as it is being measured by a voice board of said voice processing system;
   (xii) a Second OFF Time value which defines a time that there is no tone energy on a telephone line following said Second ON Time and whereby said Second OFF Time is zero for a single cadence tone;
   (xiii) a Second OFF Deviation value which defines a percent deviation allowed for said Second OFF Time of said second cadence of said cadence parameter as it is being measured by a voice board of said voice processing system; and
   (xiv) a Repetition Count value which defines a number of times a General Tone Definition cadence is seen on a said telephone line before queuing (recognizing and making use of) the General Tone Detection digit or event in said voice processing system; and
   (d) storing said tone definition block structure into memory of said voice processing system for future use in recognizing said first telephone tone.

2. A method, as described in claim 1, whereby said one or more interactive diagnostic programs comprise:
   (a) a Scan Control function;
   (b) a Call Progress Definition function;
   (c) a Scan Results function; and
   (d) a Smartcall function.

3. A method, as described in claim 2, whereby said scan control function defines criteria used for performing said scanning of said first telephone line tone for said frequency and cadence parameters, said criteria comprising:
   (a) a File Name which defines a unique file to digitally store said frequency and cadence parameters for future use by said voice processing system;
   (b) a Scan From value which defines a beginning frequency value for performing said scanning of said first telephone line tone;
   (c) a Scan To value which defines an ending frequency value for performing said scanning of said first telephone line tone;
   (d) a Step Size value which defines a frequency step size used for performing said scanning of said first telephone line tone;
   (e) a Cadence Deviation value which defines a percent deviation allowable for said cadence parameters when arranging said cadence parameters into said tone definition block structure;
   (f) a Minimum Repetition value which defines a number of repetitions of said cadence parameter of said first telephone line tone necessary to be recognized by said scanning for said frequency and cadence parameters; and
   (g) a Telco Rounding indicator which defines whether said frequency parameters are to be arranged in said tone definition block structure as actual measured values or as values rounded to the nearest Telco frequencies.

4. A method, as described in claim 2, whereby said scan results function presents a textual display of results of said scanning of said first telephone line tone for measuring said frequency and cadence parameters and for said storing of said tone definition block structure into said memory of said voice processing system, comprising:
- (a) a count indicating a number of times said first cadence was measured during said scanning of said first telephone line tone;
- (b) a first frequency parameter as measured during said scanning of said first telephone line tone;
- (c) a second frequency parameter as measured during said scanning of said first telephone line tone;
- (d) a first cadence on parameter as measured during scanning of said first telephone line tone;
- (e) a first cadence off parameter as measured during scanning of said first telephone line tone;
- (f) a second cadence on parameter as measured during scanning of said first telephone line tone;
- (g) a second cadence off parameter as measured during scanning of said first telephone line tone; and
- (h) a save option permitting said tone definition block structure to be saved to a non-volatile memory of said voice processing system.

5. A method, as described in claim 2, whereby said Smartcall function presents a graphical display of said frequency and cadence parameters as measured during said scanning of said first telephone line tone for frequency parameters and cadence parameters, comprising:
- (a) a bar graph displaying said first frequency and said second frequency along a horizontal axis said horizontal axis representing a frequency scan range beginning at said scan from frequency and ending at said scan to frequency;
- (b) a square wave representing said first cadence parameters and said second cadence parameters, if any, whereby a first rising part of said square wave indicates said first cadence on and a first falling part of said square wave indicates said first cadence off and a second rising part of said square wave coupled with a second falling part of said square wave, if different from said first rising part and first falling part of said square wave indicates said second cadence value;
- (c) a first numerical value displayed within said first rising part of said square wave which indicates the value of said first cadence on;
- (d) a numerical value displayed within said first falling part of said square wave which indicates the value of said first cadence off;
- (e) a numerical value displayed within said second rising part of said square wave which, if said second rising part of said square wave and said second falling part of said square wave are, as a sum, different from said first rising part of said square wave and said first falling part of said square wave, represents said second cadence on, otherwise it represents said first cadence on repeated;
- (f) a numerical value displayed within said second falling part of said square wave which, if said second rising part of said square wave and said second falling part of said square wave are, as a sum, different from said first rising part of said square wave and said first falling part of said square wave, represents said second cadence off, otherwise it represents said first cadence off repeated; and
- (g) a provision to enter a telephone number which is automatically dialed during said scanning of said first telephone line tone for frequency parameters and cadence parameters for which a specific tone to be scanned is generated.

6. A method, as described in claim 1, whereby said tone definition block structure is created by use of a telephone handset in cooperation with a first voice menu selection operating in said voice processing system.

7. A method, as described in claim 6, whereby said first voice menu selection is from the group consisting of technician set-up function, tone documentation function, learn tones function, and driver parameters function.

8. A method, as described in claim 7, whereby said technician set-up function provides a second voice menu selection, whereby said second voice menu selection is from the group consisting of enter dial string used to test call transfer or ringback tone or busy tone or fast busy tone, enter port number of a PBX extension used for busy tone creation, enter dial digit sequence to transfer call back, test call transfer, and play call transfer.

9. A method, as described in claim 8, whereby said enter dial string is used to test call transfer or ringback or busy or fast busy, is entered in ASCII code, and terminated with a 0,0 entry.

10. A method, as described in claim 8, whereby when said enter port number of a PBX extension used for busy tone creation is not entered, busy tone creation is accomplished manually by taking said PBX extension off-hook.

11. A method, as described in claim 8, whereby said enter dial digit sequence to transfer call back is that of the originator telephone extension number and is entered in ASCII code and terminated with a 0,0 entry.

12. A method, as described in claim 8, whereby said test call transfer is comprised of:
- (a) a step 1 whereby said port number of a PBX extension used to create a busy tone is automatically taken off-hook or, if no said port number value of said PBX extension exists, said PBX extension is physically taken off-hook;
- (b) a step 2 whereby a telephone call is made to said PBX extension by an automatic dialing of said dial string;
- (c) a step 3 whereby a busy tone is encountered for said dial string dialed;
- (d) a step 4 whereby said dial digit sequence is automatically dialed for said call transfer to occur; and
- (e) a step 5 whereby when said step 4 does not occur, a new call to said PBX is required.

13. A method, as described in claim 12, whereby when said new call to said PBX is made, said driver parameters function of said first voice menu selection is selected.

14. A method, as described in claim 13, whereby said driver parameters function provides a sixth voice menu selection, whereby said sixth voice menu selection is from the group consisting of:
- (a) playback parameters comprising:
  - (1) a step 1 whereby said playback parameters are selected from a seventh voice menu group consisting of call transfer parameters, call progress parameters, and tone definition block structure parameters; and (2) a step 2 whereby a first exit is selected to cause said seventh voice menu selection to re-occur;

(b) record parameters comprising;
  (1) a step 1 whereby said record parameters are selected from said seventh menu selection;
  (2) a step 2 whereby said selected record parameter is changed;
  (3) a step 3 whereby said selected record parameter is stored; and
  (4) a step 4 whereby said first exit is selected to cause said seventh voice menu selection to re-occur; and (c) a said first exit to cause first voice menu selection to re-occur.

15. A method, as described in claim 7, whereby said tone documentation function provides a third voice menu selection, whereby said third voice menu selection is from the group consisting of:

(a) recording a first telephone tone, comprising:
  (1) a step 1 whereby said first telephone tone is of a fourth voice menu selection presenting a list of possible telephone tones from which one is chosen for testing;
  (2) a step 2 whereby a telephone call is made by automatically dialing said dial string;
  (3) a step 3 whereby said first telephone tone is recorded;
  (4) a step 4 whereby said call transfer automatically occurs; and
  (5) a step 5 whereby said first exit causes said third voice menu selection to re-occur;

(b) verifying said first telephone tone, comprising:
  (1) a step 1 whereby said first telephone tone recorded is selected for verification from a list of possible telephone tones; and
  (2) a step 2 whereby said verifying said first telephone tone is selected from a fifth voice menu selection from the group consisting of:
    (a) verifying said first telephone tone recorded, comprising:
      (1) a step 1 whereby said first telephone tone recorded is played back for verification;
      (2) a step 2 whereby when said first telephone tone is verified, said first exit is selected causing said fifth voice menu group to re-occur to continue said verifying said first telephone tone; and
      (3) a step 3 whereby when said first telephone tone is not verified, a second exit is selected causing said third voice menu group to re-occur to repeat said recording said first telephone tone; and (b) documenting said first telephone tone, consisting of:
  (1) a step 1 whereby said first telephone tone recorded is stored in memory of said voice processing system; and
  (2) a step 2 whereby said first exit is selected causing said third voice menu group to re-occur to continues said tone documentation function; and (c) a first exit causing first voice menu selection to re-occur.

16. A method, as described in claim 7, whereby said learn tones function provides automatic tone analysis comprising:

(a) calculation of said frequency parameters and cadence parameters based on said documented first telephone tone;

(b) said arranging said frequency and cadence parameters in said tone definition block structure; and (c) said storing said tone definition block structure into memory of said voice processing system.

17. A method, as described in claim 7, whereby said driver parameters function provides a sixth voice menu selection, whereby said sixth voice menu selection is from the group consisting of:

(a) playback parameters comprising:
  (1) a step 1 whereby said playback parameters are selected from a seventh voice menu group consisting of call transfer parameters, call progress parameters, and tone definition block structure parameters; and
  (2) a step 2 whereby a first exit is selected to cause said seventh voice menu selection to re-occur;

(b) record parameters comprising;
  (1) a step 1 whereby said record parameters are selected from said seventh menu selection;
  (2) a step 2 whereby said selected record parameter is changed;
  (3) a step 3 whereby said selected record parameter is stored; and
  (4) a step 4 whereby said first exit is selected to cause said seventh voice menu selection to re-occur; and (c) a said first exit to cause first voice menu selection to re-occur.

* * * * *